(12) United States Patent
Reichel et al.

(10) Patent No.: US 6,184,598 B1
(45) Date of Patent: Feb. 6, 2001

(54) SEALING RING FOR AN OSCILLATING MOTOR

(75) Inventors: Klaus Reichel, Domsühl; Stefan Beetz, Idar-Oberstein, both of (DE)

(73) Assignee: PNP Luftfedersysteme GmbH, Crivitz (DE)

( * ) Notice: Under 35 U.S.C. 154(b), the term of this patent shall be extended for 0 days.

(21) Appl. No.: 09/446,468

(22) PCT Filed: Jun. 12, 1998

(86) PCT No.: PCT/DE98/01598

§ 371 Date: Mar. 20, 2000

§ 102(e) Date: Mar. 20, 2000

(87) PCT Pub. No.: WO98/58178

PCT Pub. Date: Dec. 23, 1998

(30) Foreign Application Priority Data

Jun. 17, 1997 (DE) ............................... 197 25 412
Sep. 29, 1997 (DE) ............................... 197 42 881

(51) Int. Cl.⁷ .............................. H02K 33/00; F01C 9/00
(52) U.S. Cl. ............................... 310/36; 277/407; 92/125
(58) Field of Search ............................. 277/407; 92/120, 92/121, 122, 123, 124, 125; 310/36, 37, 38, 39

(56) References Cited

U.S. PATENT DOCUMENTS

| | | | |
|---|---|---|---|
| 3,128,679 | 4/1964 | Trendle | 92/13 |
| 3,195,421 | 7/1965 | Rumsey et al. | 92/122 |
| 3,207,047 | * 9/1965 | O'Connor | 92/124 |
| 3,426,654 | 2/1969 | Laughman | 92/125 |
| 4,809,590 | 3/1989 | Naumann et al. | 92/125 |
| 5,560,621 | 10/1996 | Zutz | 277/84 |
| 5,791,444 | 8/1998 | Schiffler | 188/293 |
| 5,996,523 | * 12/1999 | Fox | 114/150 |

* cited by examiner

Primary Examiner—Nestor Ramirez
Assistant Examiner—Judson H. Jones
(74) Attorney, Agent, or Firm—Darby & Darby

(57) ABSTRACT

Known oscillating motors tend to present scaling problems; in particular they are often inadequately sealed in relation to the outside. The scaling elements also have a short service life as a result of the considerable strains to which they are subjected. The invention therefore provides an oscillating motor whose annular sealing ring consists of a sliding sealing ring (23) and a soft sealing ring, said rings being positioned next to each other on a common axis. The soft sealing ring is configured as a diagonal sealing ring (28) and is located on the sides of the pressure or discharge chambers (13, 14). The sliding sealing ring (23) is configured so that it is torsionally rigid in relation to the rotor (2). For this purpose, it preferably has two axial grooves (32), said grooves being arranged so that they are parallel and in pairs. The grooves (32) correspond to driver elements (31) located on the rotor wings (10).

10 Claims, 4 Drawing Sheets

SEALING RING FOR AN OSCILLATING MOTOR

BACKGROUND OF THE INVENTION

1. Field of the Invention

The invention relates to an oscillating motor employed in particular in the aircraft and vehicle industry.

An oscillating motor of this type consists in general of a stator with a housing having covers on both ends. One or more stator wings are arranged in the housing. A drive shaft which is equipped with an identical number of rotor wings, is supported in the covers. This stator wings and the rotor wings form several chambers having adjustable volumes. The chambers are formed as pressure and discharge chambers, respectively, and are therefore connected with respective supply and the discharge connections.

To provide internal leak-tightness, the pressure chambers and the discharge chambers are separated from each other by a respective frame scaling element which encloses the stator ring and the rotor wing, respectively.

To provide leak-tightness to the outside, a respective annular sealing clement is arranged in the region of the drive shaft between the rotor and each cover. The sealing element is preferably located in the cover.

2. Description of the Related Art

U.S. Pat. No. 3,195,421 describes an oscillating motor which has an annular scaling element in the form of a flexible diagonal sealing ring. The flexible diagonal sealing ring is inserted into an annular groove of the cover and is supported by the wall of the annular groove. Its diagonal sealing edge is oriented against the direction of the pressure towards the circumferential scaling gap located between the end faces of the cover and the rotor wing.

The diagonal scaling ring is subjected to considerable wear due to the frequent change in the relative movement between the diagonal scaling ring affixed in the cover and the rotor wings. This arrangement causes leaks at an early stage of the operation.

An oscillating motor with a similar sealing arrangement is described in U.S. Pat. No. 3,426,654, wherein the diagonal sealing ring is pre-tensioned by a flexible O-ring through a support element. This arrangement attempts a trade-off between leak-tightness and sliding characteristics by carefully dimensioning the force components which act on the diagonal sealing ring.

In this modified sealing arrangement, the sliding and sealing properties are therefore not optimized. Because of the occurring leakage, an additional cylinder seal is required on the journal of the rotor to prevent oil from leaking out. This additional cylinder seal, however, entraps the leaked material and therefore applies in the non-operating state a pressure on the diagonal sealing ring as well as on the rotation bearing, which is adversely affects the start-up characteristics of such an oscillating motor. This arrangement also shortens the service life and limits the possible application for oscillating motors of this type.

Instead of a diagonal scaling ring, a sliding sealing ring may be disposed in the cover to improve the running characteristics.

This modified sealing arrangement, however, is typically rejected because of its poor sealing properties.

Moreover, the sliding sealing ring is in constant contact with the frame sealing element of the rotor and stator wings. Since it is difficult to eliminate a relative movement between the sliding sealing ring and the frame sealing element, the frame sealing element is highly stressed, which results in a short service life.

Is therefore an object to develop a radial oscillating motor of the aforedescribed type which incorporates static sealing points between the rotor and the annular sealing elements.

SUMMARY OF THE INVENTION

This object is solved by the characterizing features of claim 1. Advantageous embodiments are described in the dependent claims 2 to 10.

The invention eliminates the aforedescribed disadvantages of the prior art. Particularly advantageous is the high leak-tightness of the pressure chambers to the outside, a wear-resistant design of the sealing elements and, at the same time, an extremely quiet running characteristics of the rotor.

Advantageously, the sealing points in the region of the rotor wings are removed away from the sliding surfaces between the rotor and the covers and instead moved to a region where this sealing point is formed by components which run relatively quiet. In this way, approximately 50% of the dynamic seals found in prior art devices are converted into static seals. Accordingly, the sliding function of the sliding sealing ring on the radial sealing gap is spatially separated from the sealing function of the sliding sealing ring on the axial sealing gap, so that the sliding sealing ring can be optimized for specific applications.

The sealing properties are also improved because the soft sealing ring, in particular a soft sealing ring in the form of a diagonal sealing ring, is exposed to the pressure of the leaking oil inside the mounting space and is therefore pressed against the scaling gaps in opposite directions. The leakage therefore remains entrained and can no longer leak out, which would otherwise be possible due to the play between the bearing journal and the cover. This arrangement eliminates additional high-pressure seals. Conversely, the increased pressure on the diagonal sealing ring improves the sealing characteristics at the sealing gap which faces the pressure chamber.

The sealing characteristics is also improved because a pressure, which represents the pressure in the pressure chamber and an identical pressure in the mounting space of the diagonal sealing ring, is applied across the entire annular surface of the sliding sealing ring. The sliding sealing ring is thereby pressed against the cover uniformly and with greater force.

To attain a quiet running characteristics, the radial sliding and sealing surface of the sliding sealing ring advantageous is greater in the radial direction than the sliding ring. In this was, the system can be adapted to specific applications.

Advantageously, a locking arrangement for preventing rotation may be provided between the rotor and the sliding sealing ring to ensure that the sliding sealing ring does not move relative to any other sealing element, i.e., neither relative to the frame sealing element nor relative to the diagonal sealing element. This locking arrangement preserves the static characteristics of the sealing point.

In a simple and cost-effective embodiment, the locking arrangement includes at least one recess in the form of an axial groove located on the sliding sealing ring and at least one driver clement on the rotor wing, wherein the recess and the driving element are in engagement with each other.

The driver element may be formed of the existing end face of one of the two legs or of both legs of the rotor wing, in which case the axial grooves would have to be provided as pairs. With such a rotation locking arrangement, the marginally sealed axial sealing gap may then be sealed with an additional soft sealing ring. This arrangement advantageously improves the leak-tightness to the outside, while at the same time ensuring a long service life of the soft sealing ring.

Advantageously, the end faces of the covers and the housing may be formed as continuous planar surfaces, wherein the covers and the housing may be secured in the radial direction by a centering element, for example a tension ring. The end faces can then be machined more accurately and the radial sealing gap better optimized, which in turn improves the leak-tightness and the hydraulic efficiency of the oscillating motor.

The invention the described hereinafter in greater detail with reference of an embodiment.

DETAILED DESCRIPTION OF THE PRESENTLY PREFERRED EMBODIMENTS

Figure 1:
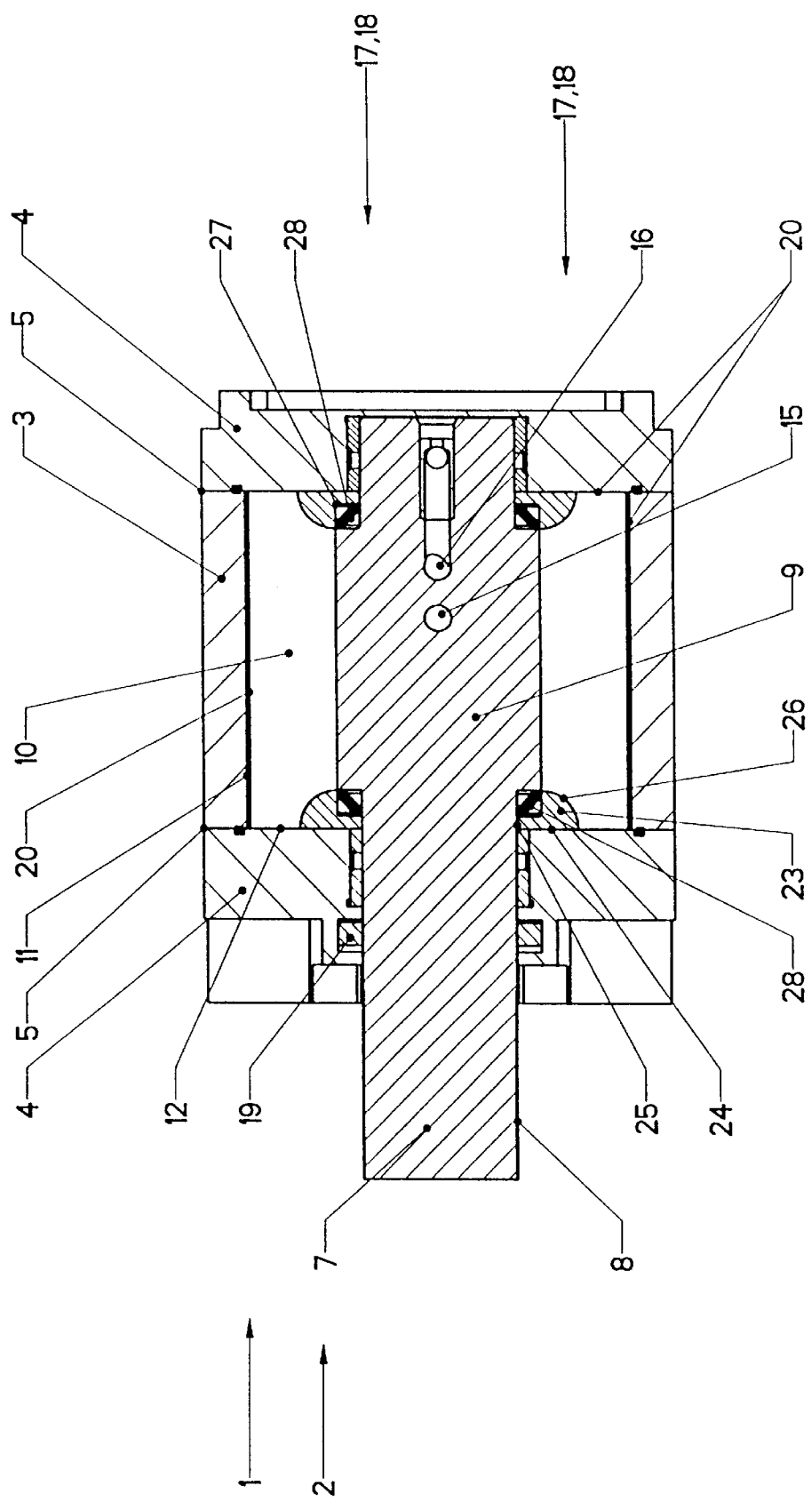
FIG. 1 shows a longitudinal cross-section of an oscillating motor.
Figure 2:
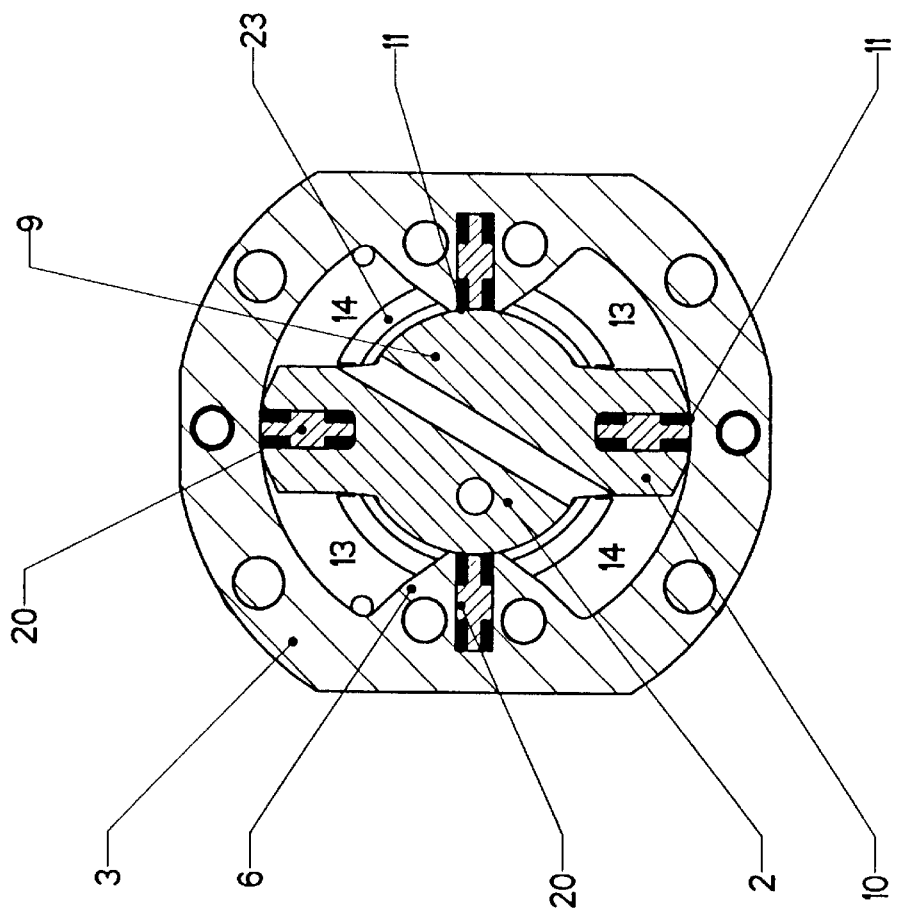
FIG. 2 shows a cross-sectional view of the oscillating motor.
Figure 3:
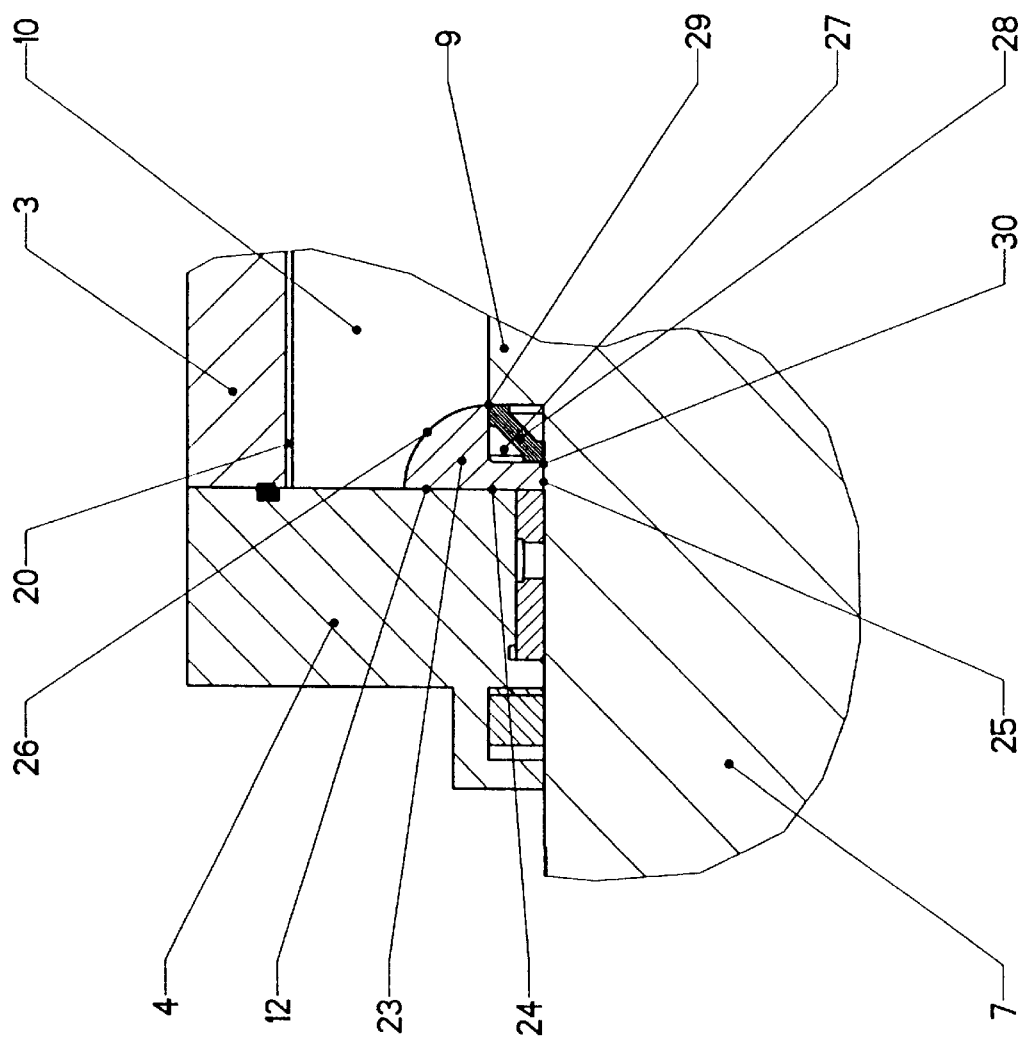
FIG. 3 is a longitudinal sectional view of a seal according to the invention.

The radial oscillating motor according to FIG. 1 consists essentially of an outer stator 1 and an inner rotor 2. The stator 1 includes a housing and covers 4 arranged at the two end faces of the housing 3. The covers may be attached with screws (not shown). A tension ring 5 located on a respective side of each cover defines the mutual radial position.

Each of the covers 4 has a respective bearing bore. A cylindrical housing bore which is divided lengthwise into two opposing free spaces by two opposing stator wings 6 which extend in the radial direction, is disposed inside the housing 3.

The rotor 2, on the other hand, consists of a drive shaft 7, with bearing journals 8 located at both ends of the drive shaft 7 and a cylinder section 9 disposed therebetween. Two rotor wings 10 which extend in opposing radial directions, are arranged in the region of the cylinder section 9. The rotor 2 is fitted inside the housing 3 of the stator 1 in such a way that an axial sealing gap 11 is formed between the head of the rotor wing and the inner wall of the housing, and between the head of the stator wing 6 and the outer surfaces of the cylinder section 9.

A respective radial sealing gap 12 is formed between the end faces of the rotor wing 10 and the end faces of the stator wing 6 and the inner surfaces of the two covers 4. Each rotor wing 10 therefore divides one of the two free spaces in the housing 3 into a pressure chamber 13 and a discharge chamber 14, thereby forming two opposing pressure chambers 13 and two opposing discharge chambers 14. Each of the pressure chambers 13 and each of the discharge chambers 14 are connected with each other by internal channels 15 and 16, respectively, while one of the two pressure chambers 13 is connected to a supply connection 17 and one of the two discharge chambers 14 is connected to a discharge connection 18.

Conventional sealing elements 19 are provided as outer seals between the covers 4 and respective bearing journals 8 and between the covers 4 and the housing 3.

To provide internal leak-tightness between the adjacent pressure chambers 13 and the discharge chambers 14, a frame sealing element 20 is arranged on each rotor wing 10 and on each stator wing 6 in the region of the axial and the radial sealing gaps 11 and 12, respectively. For this purpose, each stator wing 6 and each rotor wing 10 are provided with two legs 21 extending in the longitudinal direction, wherein the legs 21 form a center groove 22 extending over the entire height and the entire length. The frame sealing element 20 is pressed into this groove 22. In this way, each of the rotor wings 10 is sealed at its respective circumference and end faces with respect to the housing 3 and the covers 4.

An axially displaceable sliding sealing ring 23 is placed on the drive shaft 7 in the transition region from the bearing journal 8 to the cylinder section 9, so that the radial sliding and sealing surface of the sliding sealing ring 23 slidingly contacts the inner surface of the cover 4, thereby forming a radial sealing gap 24. The axial sealing surface of the sliding sealing ring 23 contacts the circumferential surface of the drive shaft 7, thereby forming an axial sealing gap 25. Between the inner surface of the sliding sealing ring 23 and the rotor wing 10 and stator wing 6, respectively, there is provided an additional sealing gap 26 which separates the adjacent pressure chambers 13 and discharge chambers 14 from each other and which is sealed by the frame sealing element 20.

The side of the sliding sealing ring 23 facing away from the cover 4 includes a recess which is designed as an mounting space 27 for a diagonal sealing ring 28. The mounting space 27 in conjunction with a stepped diameter on the cylinder section 9 of the drive shaft 7 forms a first sealing gap 29 facing towards the pressure chamber 13, and a second sealing gaps 30 facing away from the pressure chamber 13.

The diagonal sealing ring 28 may be formed, for example, of two sealing elements and a moveable guide section disposed therebetween. The diagonal sealing ring 28 is fitted into the mounting space 27 so that one sealing element contacts the first sealing edge 29, with the other sealing element contacting the second sealing edge 30.

Figure 4:
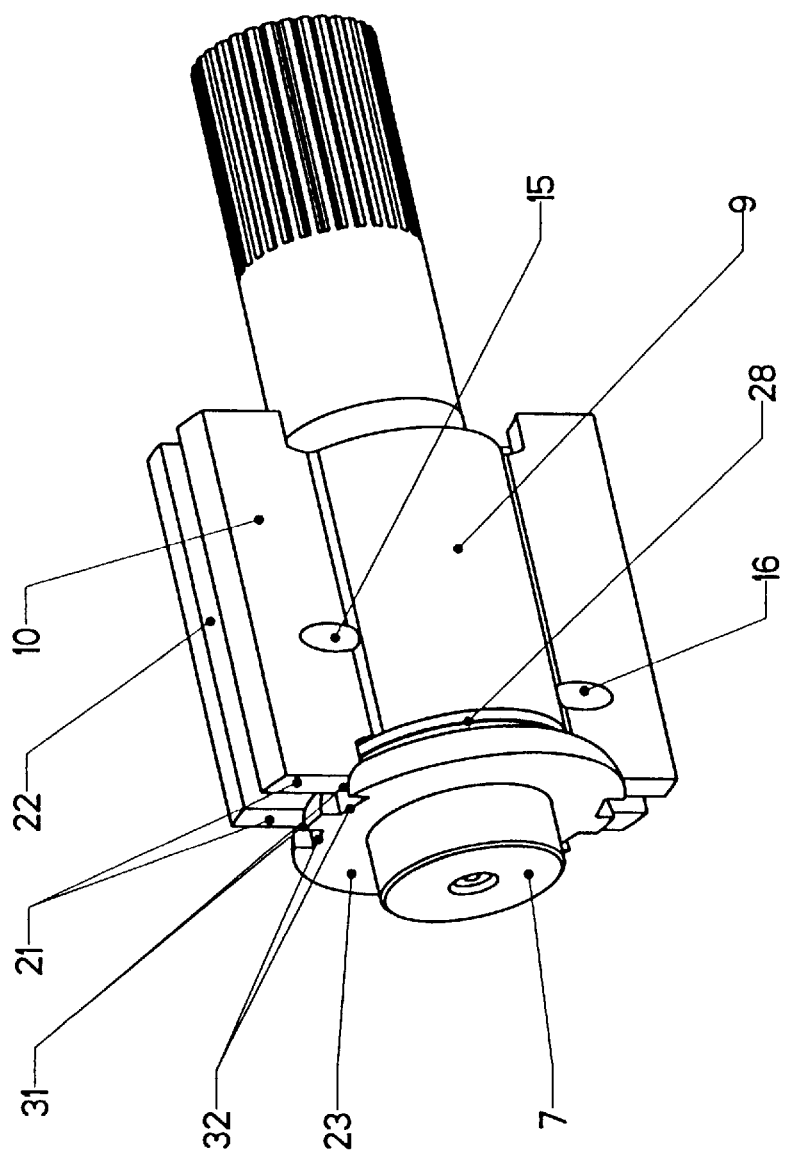
FIG. 4 is a perspective view of the rotor of the oscillating motor.

As shown with particularity in FIG. 4, the sliding sealing ring 23 and the rotor 2 have also a locking arrangement which prevents rotation therebetween.

For this purpose, the respective end faces of the two legs 21 of the rotor wing 10 which enclose the frame sealing element 20, are formed as driver elements 31.

The circumference of the sliding sealing ring 23, on the other hand, includes two opposing pairs of axial grooves 32. Each pair of grooves 32 is associated with the two legs 21 of one of the rotor wings 10. The spacing between the two grooves 32 of a pair of sliding sealing ring 23 corresponds to the spacing of the two driver elements 31 located on the legs 21 of the rotor wing 10. The dimension of each axial groove 32 also corresponds to the dimension of the corresponding opposing driver elements 31, so that in the assembled state each driver element 31 engages with an axial groove 32.

What is claimed is:

1. A radial oscillating motor comprising:
   a stator (1) having a housing (3) with two sides (3) and two covers (4) arranged on both sides of the housing (3), with at least one stator wing (6) arranged in the housing (3);
   a rotor (2) having a drive shaft (7) disposed in the covers (4) and an identical number of rotor wings (10); and wherein the stator wing (6) a and the rotor wing (10) in conjunction with the housing (3), the cylinder section (9) of the drive shaft (7) and the two covers (4) form at least one pressure chamber (13) and at least one discharge chamber (14); and the at least one pressure chamber (13) and the discharge chamber (14) are sealed to the inside by a frame sealing element (20) inserted in the stator wing and the rotor wing (10, 6), respectively; and the pressure chamber (13) and the discharge chamber (14) are sealed to both the outside and the inside by a siding sealing ring (23); and wherein the annular sealing element comprises a sliding sealing ring (23) and a soft sealing ring, with both sealing rings arranged side-by-side on a common axis and the soft sealing ring arranged on the sides of the pressure chamber (13) and the discharge chamber (14).

2. The radial oscillating motor according to claim 1, wherein the soft sealing ring is a diagonal sealing ring (28) which is oriented with one sealing member towards a sealing gap (29) facing the pressure chamber (13), and with the other sealing member towards a sealing gap (30) facing away from the pressure chamber (13).

3. The radial oscillating motor according to claim 2, wherein the sliding sealing ring (23) has a recess formed as a mounting space (27) for the diagonal sealing ring (28).

4. The radial oscillating motor according to claim 3, wherein the sliding sealing ring (23) is dimensioned so that the radial extent of the sliding and sealing surface at the sealing gap (24) is greater than the axial extent of the sealing surface at the sealing gap (25).

5. The radial oscillating motor according to claim 4, wherein the sliding sealing ring (23) and the rotor (2) have a common rotation locking arrangement.

6. The radial oscillating motor according to claim 5, wherein the rotation locking arrangement is formed of at least one recess in the sliding sealing ring (23) and a driver element (31) on the rotor wing (10), wherein the recess and the driving element (31) are in engagement with each other.

7. The radial oscillating motor according to claim 6, wherein the recess in the sliding sealing ring (23) is formed of at least one axial groove (32) and the driver element (31) is formed on one of the legs (21) of the rotor wing (10).

8. The radial oscillating motor according to claim 7, wherein two axial grooves (32) are each arranged in pairs and associated with the respective two legs (21) of a rotor wing (10), which legs (21) are provided with driver elements (31).

9. The radial oscillating motor according to claim 1, wherein the radial sealing gap (12), which is sealed by the sliding sealing ring (23), is formed on the cover (4) and on the housing (3) of continuous planar surfaces, and that the cover (4) and the housing (3) are secured in the radial direction by a respective centering element.

10. The radial oscillating motor according to claim 9, wherein the centering element is formed as a tension ring (5).

* * * * *